(12) United States Patent
Weber et al.

(10) Patent No.: US 9,573,571 B2
(45) Date of Patent: Feb. 21, 2017

(54) VENTURI BRAKE DUCT ASSEMBLY

(71) Applicant: GM GLOBAL TECHNOLOGY OPERATIONS LLC, Detroit, MI (US)

(72) Inventors: Steven J. Weber, Mount Clemens, MI (US); Heewook Lee, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 14/529,610

(22) Filed: Oct. 31, 2014

(65) Prior Publication Data

US 2016/0121859 A1 May 5, 2016

(51) Int. Cl.
  *F16D 65/12* (2006.01)
  *B60T 5/00* (2006.01)
  *F16D 65/847* (2006.01)

(52) U.S. Cl.
  CPC .............. *B60T 5/00* (2013.01); *F16D 65/847* (2013.01)

(58) Field of Classification Search
  CPC .... F16D 65/847; F16D 65/128; F16D 65/827; B60T 5/00
  USPC .................................................. 188/264 A
  See application file for complete search history.

(56) References Cited

U.S. PATENT DOCUMENTS

| | | | |
|---|---|---|---|
| 4,653,788 A * | 3/1987 | Di Giusto | B60K 11/08 188/264 A |
| 4,805,747 A * | 2/1989 | Moedinger | F16D 65/847 180/68.1 |
| 5,121,818 A * | 6/1992 | McComic | B60T 5/00 136/291 |
| 6,945,576 B1 * | 9/2005 | Arentzen | B60K 13/02 180/68.3 |
| 7,600,615 B2 | 10/2009 | Ramsay et al. | |
| 8,561,738 B2 | 10/2013 | Charnesky et al. | |
| 8,631,889 B2 | 1/2014 | Begleiter et al. | |
| 9,004,241 B2 * | 4/2015 | Browne | B60T 5/00 188/264 A |
| 2005/0284708 A1 * | 12/2005 | Christ | F16D 55/224 188/71.6 |
| 2007/0023238 A1 * | 2/2007 | Ramsay | B60T 5/00 188/71.6 |
| 2010/0147611 A1 | 6/2010 | Amano et al. | |
| 2011/0308763 A1 | 12/2011 | Charnesky et al. | |
| 2012/0318476 A1 | 12/2012 | Begleiter et al. | |

FOREIGN PATENT DOCUMENTS

JP 04169309 A * 6/1992

OTHER PUBLICATIONS

Article entitled "Venturi effect" from the Wikipedia, the free encyclopedia website http://en.wikipedia.org/w/index.php?title=Venturi_effect&oldid=606072107; retrieval date: May 15, 2014; 6 pages.

* cited by examiner

*Primary Examiner* — Robert A Siconolfi
*Assistant Examiner* — Mahbubur Rashid
(74) *Attorney, Agent, or Firm* — Quinn Law Group, PLLC

(57) ABSTRACT

A vehicle is disclosed. The vehicle includes a body. The body includes a forward end and a rearward end spaced from each other along a longitudinal axis. The forward end of the body defines an opening for allowing airflow into the body. The vehicle also includes a venturi brake duct assembly positioned relative to the opening to receive the airflow from the opening and to guide the airflow to a brake device for cooling the brake device.

20 Claims, 2 Drawing Sheets

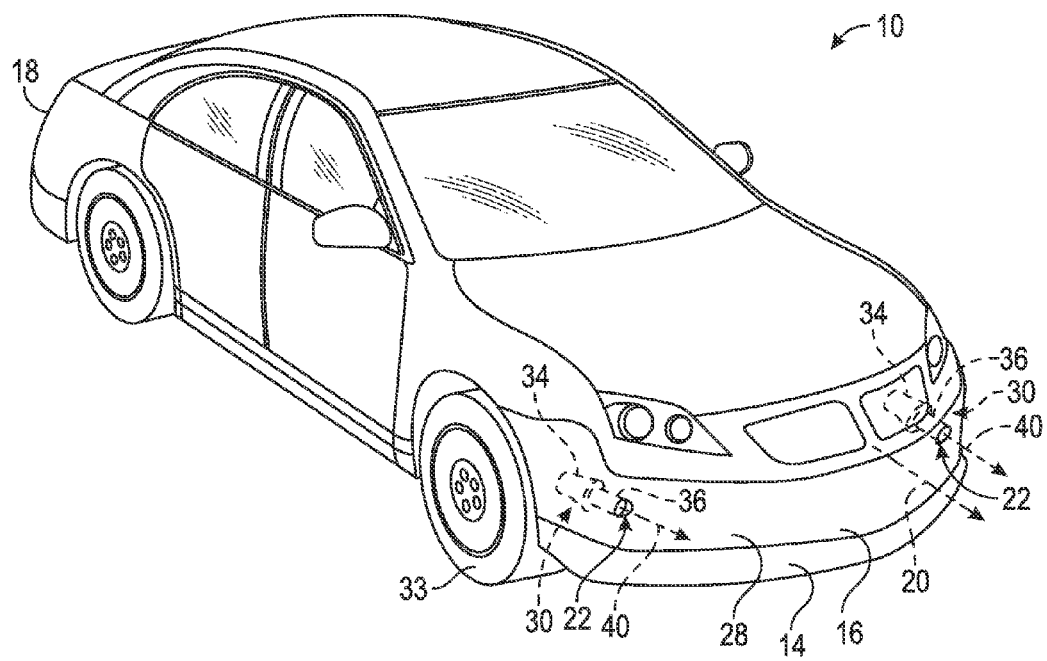
FIG. 1
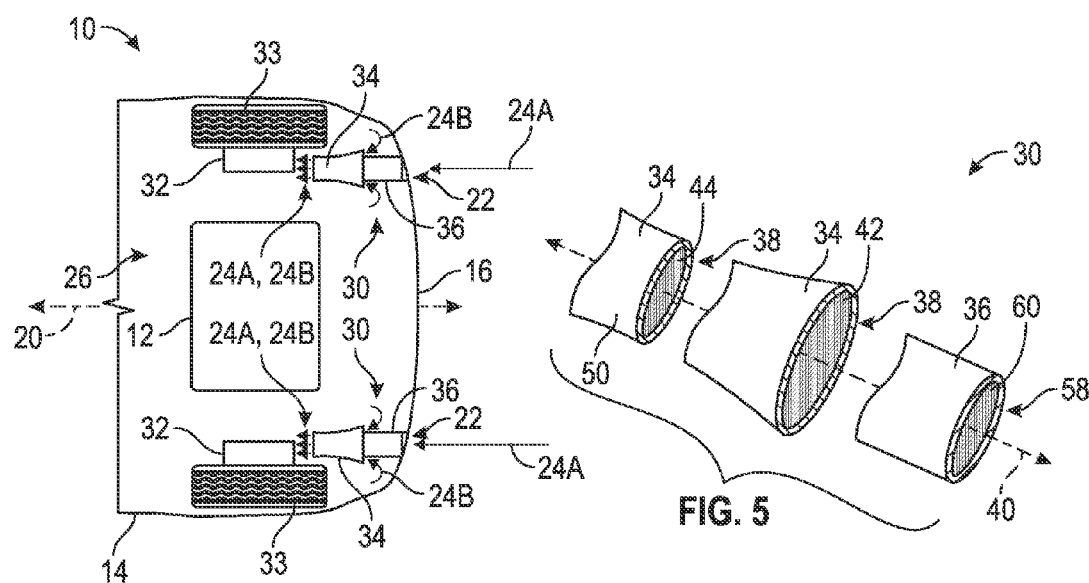
FIG. 2
FIG. 5

VENTURI BRAKE DUCT ASSEMBLY

TECHNICAL FIELD

The present disclosure relates to a venturi brake duct assembly.

BACKGROUND

Vehicles can include a brake duct which collects a flow of air and directs the airflow to a brake device to cool the brake device. Generally the brake duct is in fluid communication with an opening in a forward end of the vehicle. For example, the opening may be defined in a front bumper.

Many different brake ducts have been designed. For example, one type of brake duct utilizes a square or circular cross-sectional tube having a constant cross-sectional area, and this tube directs the airflow to the brake device. Another type of brake duct utilizes a ramp that is formed in the front bumper which changes the direction of the airflow, and thus does not utilize a tube. Yet another type of brake duct utilizes a flap that can move between a first position closing the opening and a second position opening the opening. With this type of brake duct, the flap is motorized to move the flap between the positions, and thus does not utilize a tube. The above discussed brake ducts can cause drag on the vehicle which can affect the fuel efficiency of the vehicle.

SUMMARY

The present disclosure provides a vehicle including a body. The body includes a forward end and a rearward end spaced from each other along a longitudinal axis. The forward end of the body defines an opening for allowing airflow into the body. The vehicle also includes a venturi brake duct assembly positioned relative to the opening to receive the airflow from the opening and to guide the airflow to a brake device for cooling the brake device.

In certain embodiments, the present disclosure provides a vehicle including a body. The body includes a front bumper fascia defining an opening for allowing airflow into the body. The vehicle also includes a venturi brake duct assembly positioned relative to the opening to receive the airflow from the opening and to guide the airflow to a brake device for cooling the brake device. The venturi brake duct assembly includes a first tube defining an aperture along a central axis. The opening aligns with the central axis such that the aperture and the opening cooperate to guide the airflow to the brake device. The aperture presents a first cross-sectional area and a second downstream cross-sectional area less than the first cross-sectional area which increases a velocity of the airflow through the first tube.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic perspective view of a vehicle, with a venturi brake duct assembly in hidden lines.

FIG. 2 is a schematic fragmentary plan view of the vehicle illustrating the venturi brake duct assembly.

FIG. 5 is a schematic fragmentary cross-sectional exploded perspective view of the first tube and the second tube taken from lines 5-5 of FIG. 3, with a first cross-sectional area, a second downstream cross-sectional area and a second tube cross-sectional area each illustrated in shading lines.

DETAILED DESCRIPTION

Figure 3:
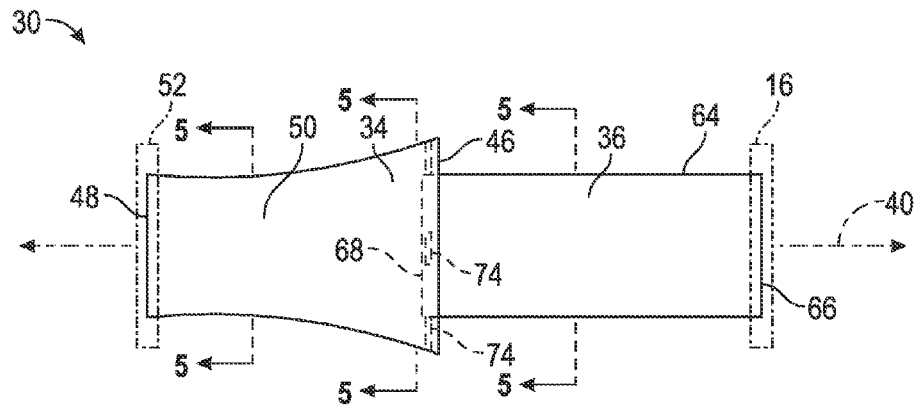
FIG. 3 is a schematic side view of a first tube and a second tube of the venturi brake duct assembly.

Those having ordinary skill in the art will recognize that terms such as "above", "below", "upward", "up", "downward", "down", "top", "bottom", "left", "right", "back", "forth", "forward", "rearward", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Referring to the Figures, wherein like numerals indicate like or corresponding parts throughout the several views, a vehicle 10 is generally shown in FIG. 1. The vehicle 10 can be an automotive vehicle 10, such as, a car, a truck, etc. It is to be appreciated that the vehicle 10 can alternatively be a non-automotive vehicle 10, such as, a farm vehicle 10, an aviation vehicle 10, etc.

Turning to FIG. 2, the vehicle 10 can include a power source 12 that is utilized to propel the vehicle 10. The power source 12 can be an engine such as an internal combustion engine that combusts a mixture of air and fuel within one or more combustion chambers to produce a mechanical output. Furthermore, the vehicle 10 can be a hybrid vehicle 10 in which the power source 12 can be an internal combustion engine and one or more motor-generators. Additionally, the vehicle 10 can be an electric vehicle 10 in which the power source 12 can be one or more motor-generators and eliminates the internal combustion engine.

Referring to FIG. 1, the vehicle 10 includes a body 14. The body 14 includes a forward end 16 and a rearward end 18 spaced from each other along a longitudinal axis 20. The forward end 16 of the body 14 defines an opening 22 for allowing airflow, identified as arrow 24A, into the body 14. Specifically, when the vehicle 10 is moving forward, a flow of air can enter the opening 22. In other words, air can flow through the body 14 via the opening 22.

In certain embodiments, the body 14 can define an engine compartment 26 proximal to the forward end 16. The power source 12 can be disposed in the engine compartment 26. Airflow, identified as arrow 24B, can also occur in the engine compartment 26. Specifically, when the vehicle 10 is moving, a flow of air can occur under the vehicle 10 which can enter the engine compartment 26. Therefore, airflow 24A can occur through the opening 22 and airflow 24B can occur in the engine compartment 26.

In certain embodiments, the body 14 can include a front bumper fascia 28 defining the opening 22 for allowing airflow 24A into the body 14. In one embodiment, the forward end 16 of the body 14 can include the front bumper fascia 28 defining the opening 22. It is to be appreciated that the opening 22 can be defined in other features of the forward end 16 of the vehicle 10.

Referring to FIGS. 1 and 2, the vehicle 10 also includes a venturi brake duct assembly 30 positioned relative to the opening 22 to receive the airflow 24A from the opening 22 and to guide the airflow 24A to a brake device 32 for cooling the brake device 32. As discussed further below, the venturi brake duct assembly 30 is configured to increase the airflow 24A, 24B guided toward the brake device 32 to cool the brake device 32 and to increase the airflow 24B in the engine compartment 26. Furthermore, the venturi brake duct assembly 30 is configured to maximize the airflow 24A, 24B guided to the brake device 32 while also minimizing aerodynamic drag on the vehicle 10. Minimizing drag on the vehicle 10 can improve fuel efficiency.

The brake device 32 can include various components of a brake. For example, the brake device 32 can include a brake caliper, one or more brake pads, etc. The brake device 32 can be located proximal to a wheel 33 of the vehicle.

Figure 4:
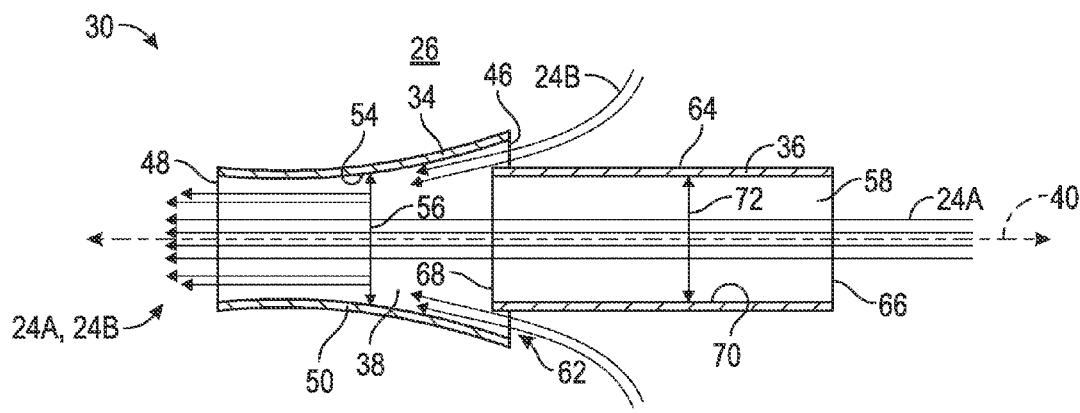
FIG. 4 is a schematic cross-sectional view of the first tube and the second tube of FIG. 3.

Turning to FIGS. 2-4, the venturi brake duct assembly 30 can include a first tube 34 and a second tube 36 cooperating with each other to increase a velocity of the airflow 24A, 24B guided to the brake device 32. Specifically, the flow rate of the air is improved utilizing the venturi brake duct assembly 30 as compared to a constant cross-sectional area tube as discussed in the background section.

The first and second tubes 34, 36 can be formed of any suitable material(s). For example, the first tube 34 and/or the second tube 36 can be formed of a polymeric material, a plastic material, a metal material, an alloy material, a composite material, or combinations thereof.

The venturi brake duct assembly 30 can include the first tube 34 that cooperates with the opening 22 to guide the airflow 24A, 24B through the first tube 34. Turning to FIG. 4, the first tube 34 can define an aperture 38 along a central axis 40. The opening 22 aligns with the central axis 40 (see FIG. 1) such that the aperture 38 and the opening 22 cooperate to guide the airflow 24A, 24B to the brake device 32.

Referring to FIG. 5, the aperture 38 of the first tube 34 can present a first cross-sectional area 42 and a second downstream cross-sectional area 44 less than the first cross-sectional area 42 which increases the velocity of the airflow 24A, 24B through the first tube 34. Specifically, decreasing the cross-sectional area of the first tube 34 causes a pressure drop at the constriction and the velocity of the airflow 24A, 24B increases as the airflow 24A, 24B passes through the constriction which can be referred to as the venturi effect. The second cross-sectional area 44 is disposed downstream from the first cross-sectional area 42 in the direction the airflow 24A is traveling. Therefore, as the vehicle 10 moves forward, the airflow 24A moves downstream from the opening 22 through the second tube 36 and through the first tube 34 toward the brake device 32.

Turning to FIGS. 3 and 4, the first tube 34 can include a first inlet 46 and a first outlet 48 spaced from each other along the central axis 40. The first tube 34 can include a middle portion 50 disposed between the first inlet 46 and the first outlet 48. In certain embodiments, the first cross-sectional area 42 is adjacent to the first inlet 46 and the second downstream cross-sectional area 44 is along the middle portion 50. Therefore, the second cross-sectional area 44 is disposed downstream from the first inlet 46. The first outlet 48 of the first tube 34 can be supported by a bracket 52 which is shown in phantom lines in FIG. 3. The bracket 52 can be coupled to the body 14 and/or a frame of the vehicle 10 or any other component to support the bracket 52.

Referring to FIG. 4, the first tube 34 can include an inner surface 54 facing the central axis 40. In certain embodiments, the inner surface 54 of the first tube 34 defines a circular configuration. Therefore, the inner surface 54 of the first tube 34 can define an inner diameter 56. In certain embodiments, the inner diameter 56 of the first tube 34 decreases in size from the first inlet 46 toward the middle portion 50 which increases the velocity of the airflow 24A, 24B through the first tube 34. Generally, the inner diameter 56 adjacent to the first inlet 46 is greater than the inner diameter 56 along the middle portion 50. For example, the flow rate of the air can be increased by about 9.0 percent as compared to a constant cross-sectional area tube as discussed in the background section. The configuration of the first tube 34 provides an increase in velocity of the airflow 24A, 24B through the first tube 34, the details of which are discussed below. Improving the flow rate provides improved cooling of the brake device 32.

Turning to FIGS. 1-3, the venturi brake duct assembly 30 can include the second tube 36 supported by the forward end 16 of the body 14 and the first tube 34 such that the second tube 36 aligns with the opening 22 and the first tube 34 to guide the airflow 24A through the second tube 36 and into the first tube 34. In certain embodiments, the second tube 36 is supported by the front bumper fascia 28 and the first tube 34 such that the first tube 34 and the second tube 36 partially overlap (see FIGS. 3 and 4). The first and second tubes 34, 36 partially overlap to guide the airflow 24A from the second tube 36 into the first tube 34. Therefore, airflow 24A enters the second tube 36 before the first tube 34.

Referring to FIGS. 4 and 5, the second tube 36 can define a hole 58 along the central axis 40. The opening 22 aligns with the central axis 40 such that the hole 58 and the opening 22 cooperate to guide the airflow 24A through the second tube 36 and into the first tube 34. The hole 58 can define a second tube cross-sectional area 60 less than the first cross-sectional area 42 of the first tube 34.

As best shown in FIG. 4, the first inlet 46 of the first tube 34 and a portion of the second tube 36 overlap in a spaced relationship to define a space 62 between the inner surface 54 of the first tube 34 and an outer surface 64 of the second tube 36. Said differently, the inner surface 54 of the first tube 34 and the outer surface 64 of the second tube 36 define the space 62 therebetween where the first and second tubes 34, 36 overlap. Airflow 24B in the engine compartment 26 enters the first tube 34 through the space 62 due to the configuration of the first tube 34 increasing the velocity of airflow 24A, 24B through the first tube 34. Specifically, the venturi effect pulls the airflow 24B from the engine compartment 26 into the first tube 34. Pulling the airflow 24B from the engine compartment 26 into the first tube 34 increases movement of the airflow 24B in the engine compartment 26, and thus improves movement of the airflow 24B in the engine compartment 26. This movement of airflow 24B in the engine compartment 26 can cool various components positioned in the engine compartment 26. In addition to airflow 24B from the engine compartment 26 or alternatively from, airflow 24B from behind the forward end 16, such as behind the front bumper fascia 28, can enter the first tube 34 through the space 62.

Referring to FIGS. 3 and 4, the second tube 36 can include a second inlet 66 and a second outlet 68 spaced from each other along the central axis 40. The second inlet 66 can be coupled to the forward end 16 of the body 14 and the second outlet 68 can be coupled to the first inlet 46 of the first tube 34. In certain embodiments, the second inlet 66 of the second tube 36 is supported by the front bumper fascia 28 such that the hole 58 and the opening 22 align to guide the airflow 24A through the second tube 36. Therefore, the first tube 34 is spaced from the forward end 16 of the vehicle 10. Specifically, the second tube 36 is generally disposed between the first tube 34 and the forward end 16 of the vehicle 10.

In certain embodiments, the second tube cross-sectional area 60 is constant between the second inlet 66 and the second outlet 68. In other words, the second tube cross-sectional area 60 does not substantially change. The second tube cross-sectional area 60 can be minimized to minimize drag on the forward end 16 of the vehicle 10. Simply stated, the size of the hole 58 is minimized to minimize drag on the forward end 16 of the vehicle 10. The first tube 34 is spaced from the forward end 16 such that the smaller sized second inlet 66 directly cooperates with the opening 22 of the forward end 16 of the body 14 to minimize drag. The size of the second inlet 66 is less than the size of the first inlet 46 to minimize drag on the forward end 16. The smaller the size of the second inlet 66, the less air that can enter the second tube 36 which minimizes drag on the vehicle 10. Since less air can enter the second tube 36 due to the size of the second inlet 66, it is desirable to increase airflow 24A, 24B at another location, which is provided by the first tube 34. The airflow 24A is fed to the first tube 34 partially by the second tube 36 and additional airflow 24B enters the first tube 34 through the space 62 which improves the flow rate of the air as well as increasing the velocity of the airflow 24A, 24B that exits the first outlet 48.

Continuing with FIG. 4, the second tube 36 can include an inner surface 70 facing the central axis 40. The inner surface 70 of the second tube 36 can define the hole 58. In certain embodiments, the inner surface 70 of the second tube 36 defines a circular configuration. Therefore, the inner surface 70 of the second tube 36 can define an inner diameter 72. In certain embodiments, the inner diameter 72 of the second tube 36 is constant between the second inlet 66 and the second outlet 68 of the second tube 36. In other words, the inner diameter 72 of the second tube 36 does not substantially change.

Turning to FIG. 3, the first tube 34 can include a plurality of ribs 74 extending into the aperture 38 toward the central axis 40. The second outlet 68 of the second tube 36 is supported by the ribs 74. Specifically, the ribs 74 engage the outer surface 64 of the second tube 36. Therefore, the ribs 74 maintain the position of the second outlet 68 of the second tube 36 relative to the first inlet 46 of the first tube 34. Simply stated, the ribs 74 couple together the first and second tubes 34, 36. It is to be appreciated that the first and second tubes 34, 36 can be coupled to each other by other methods, such as fasteners, snaps, clips, slip fit, snap fit, etc.

Figure 6:
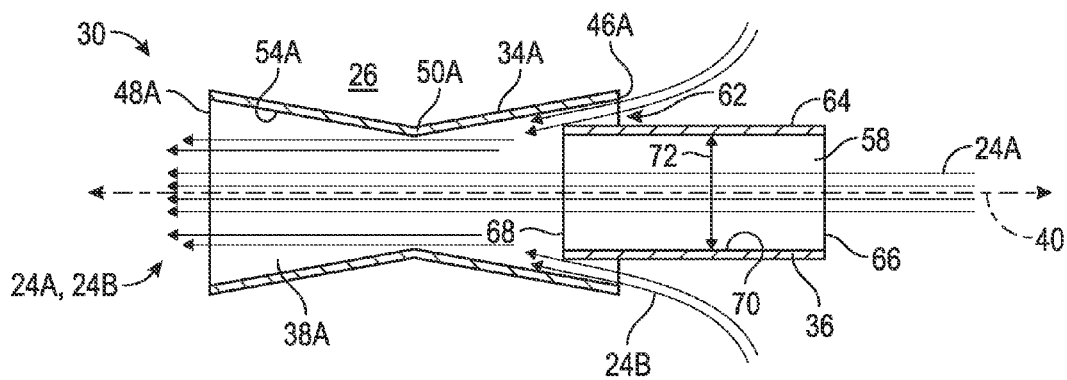
FIG. 6 is schematic cross-sectional view of a different configuration of the first tube.

The first tube 34 can be other configurations than illustrated in FIGS. 1-5. FIG. 6 illustrates another suitable configuration for the first tube 34A which functions the same as discussed above and cooperates with the second tube 36 as discussed above, and therefore, these details will not be re-discussed. In this embodiment, similar to the other embodiment discussed above, the second downstream cross-sectional area 44 is less than the first cross-sectional area 42 which increases the velocity of the airflow 24A, 24B through the first tube 34A. Specifically, as discussed above, decreasing the cross-sectional area of the first tube 34A causes a pressure drop at the constriction and the velocity of the airflow 24A, 24B increases as the airflow 24A, 24B passes through the constriction. Similar to the other embodiment, the first cross-sectional area 42 is adjacent to the first inlet 46A and the second downstream cross-sectional area 44 is along the middle portion 50A. As also discussed above, the second cross-sectional area 44 is disposed downstream from the first cross-sectional area 42 in the direction the airflow 24A is traveling. Therefore, as the vehicle 10 moves forward, the airflow 24A moves downstream from the opening 22 through the second tube 36 and through the first tube 34 toward the brake device 32. It is to be appreciated that the first tube 34, 34A can have other configurations than illustrated.

A plurality of venturi brake duct assemblies 30 can be utilized for the vehicle 10 as shown in FIGS. 1 and 2. Generally, one venturi brake duct assembly 30 cooperates with one brake device 32 proximal to one wheel 33 and another venturi brake duct assembly 30 cooperates with another brake device 32 proximal to another wheel 33. The wheels 33 can be the front wheels of the vehicle 10.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
    a body including a forward end and a rearward end spaced from each other along a longitudinal axis, wherein the forward end of the body defines an opening for allowing a first airflow into the body; and
    a venturi brake duct assembly positioned relative to the opening to receive the first airflow from the opening and to guide the first airflow to a brake device for cooling the brake device;
    wherein the venturi brake duct assembly includes a first tube and a second tube defining a space therebetween, with the space allowing a second airflow into the first tube which bypasses the second tube;
    wherein the first tube includes a first inlet and a first outlet;
    wherein the second tube includes a second inlet and a second outlet, with the second inlet coupled to the forward end of the body and the second outlet coupled to the first inlet of the first tube;
    wherein the first tube defines an aperture and includes a plurality of ribs extending into the aperture, with the second outlet of the second tube supported by the ribs.

2. The vehicle as set forth in claim 1 wherein the first tube and the second tube cooperate with each other to increase a velocity of the airflow guided to the brake device, with the second tube partially disposed inside the first tube such that a portion of an inner surface of the first tube and a portion of an outer surface of the second tube face each other and are spaced from each other to further define the space that the second airflow enters when bypassing the second tube.

3. The vehicle as set forth in claim 1 wherein the first tube cooperates with the opening to guide the first airflow through the first tube.

4. The vehicle as set forth in claim 3 wherein the aperture of the first tube is disposed along a central axis, with the opening aligning with the aperture coaxially relative to the central axis to guide the first airflow to the brake device.

5. The vehicle as set forth in claim 4 wherein the aperture of the first tube presents a first cross-sectional area and a second downstream cross-sectional area less than the first cross-sectional area which increases a velocity of the airflow through the first tube.

6. The vehicle as set forth in claim 5 wherein the first tube includes a first inlet and a first outlet spaced from each other along the central axis, and wherein the first tube includes a middle portion disposed between the first inlet and the first outlet, with the first cross-sectional area being adjacent to the first inlet and the second downstream cross-sectional area being along the middle portion.

7. The vehicle as set forth in claim 6 wherein the first tube includes an inner surface that faces the central axis, with the inner surface of the first tube defining an inner diameter that gradually decreases in size from the first inlet toward the middle portion which increases the velocity of the airflow through the first tube.

8. The vehicle as set forth in claim 4 wherein the second tube is supported by the forward end of the body and the first tube such that a hole defined by the second tube aligns with the opening and the aperture coaxially relative to the central axis to guide the first airflow through the second tube and into the first tube.

9. The vehicle as set forth in claim 8 wherein:
the aperture of the first tube presents a first cross-sectional area and a second downstream cross-sectional area less than the first cross-sectional area which increases a velocity of the airflow through the first tube;
the first inlet and the first outlet are spaced from each other along the central axis;
the first tube includes a middle portion disposed between the first inlet and the first outlet; and
the hole defines a second tube cross-sectional area less than the first cross-sectional area of the first tube.

10. The vehicle as set forth in claim 9 wherein the first inlet of the first tube and a second outlet of the second tube overlap in a spaced relationship to define the space between an inner surface of the first tube and an outer surface of the second tube.

11. The vehicle as set forth in claim 10 wherein the body defines an engine compartment proximal to the forward end, and wherein the second airflow, which is from the engine compartment, enters the first tube through the space due to the configuration of the first tube increasing the velocity of airflow through the first tube.

12. The vehicle as set forth in claim 9 wherein the second inlet and the second outlet are spaced from each other along the central axis.

13. The vehicle as set forth in claim 12 wherein the second tube includes an inner surface facing the central axis, with the inner surface defining the hole, and wherein the inner surface of the second tube defines an inner diameter being constant between the second inlet and the second outlet of the second tube.

14. The vehicle as set forth in claim 12 wherein the forward end of the body includes a front bumper fascia defining the opening, with the second inlet of the second tube supported by the front bumper fascia such that the hole and the opening align to guide the first airflow through the second tube.

15. The vehicle as set forth in claim 3 wherein the first outlet of the first tube is supported by a bracket.

16. A vehicle comprising:
a body including a front bumper fascia defining an opening for allowing airflow into the body;
a venturi brake duct assembly positioned relative to the opening to receive the airflow from the opening and to guide the airflow to a brake device for cooling the brake device;
wherein the venturi brake duct assembly includes a first tube defining an aperture along a central axis, with the opening aligning with the central axis such that the aperture and the opening cooperate to guide the airflow to the brake device; and
wherein the aperture presents a first cross-sectional area and a second downstream cross-sectional area less than the first cross-sectional area which increases a velocity of the airflow through the first tube;
wherein the venture brake duct assembly includes a second tube defining a hole along the central axis, and wherein the aperture and the hole are coaxial relative to the central axis;
wherein the first tube includes a plurality of ribs extending into the aperture toward the central axis, with the second tube supported by the ribs.

17. The vehicle as set forth in claim 16 wherein the second tube is supported by the front bumper fascia and the first tube such that the first tube and the second tube partially overlap, and the hole of the second tube aligns with the opening and the aperture coaxially relative to the central axis to guide the airflow through the second tube and into the first tube.

18. The vehicle as set forth in claim 17 wherein an inner surface of the first tube and an outer surface of the second tube define a space therebetween where the first and second tubes overlap, and wherein the body defines an engine compartment proximal to the forward end, and airflow in the engine compartment enters the first tube through the space due to the configuration of the first tube increasing the velocity of airflow through the first tube.

19. The vehicle as set forth in claim 16 wherein the first tube includes a first inlet and a first outlet spaced from each other along the central axis, and wherein the first tube includes a middle portion disposed between the first inlet and the first outlet, with the first cross-sectional area being adjacent to the first inlet and the second downstream cross-sectional area being along the middle portion.

20. A vehicle comprising:
a body including a forward end and a rearward end spaced from each other along a longitudinal axis, wherein the forward end of the body defines an opening for allowing a first airflow into the body;
a venturi brake duct assembly positioned relative to the opening to receive the first airflow from the opening and to guide the first airflow to a brake device for cooling the brake device;
wherein the venturi brake duct assembly includes a first tube and a second tube defining a space therebetween, with the space allowing a second airflow into the first tube which bypasses the second tube;
wherein the first tube cooperates with the opening to guide the first airflow through the first tube;
wherein the first tube defines an aperture along a central axis, with the opening aligning with the aperture coaxially relative to the central axis to guide the first airflow to the brake device;
wherein the second tube is supported by the forward end of the body and the first tube such that a hole defined by the second tube aligns with the opening and the aperture coaxially relative to the central axis to guide the first airflow through the second tube and into the first tube;

wherein the aperture of the first tube presents a first cross-sectional area and a second downstream cross-sectional area less than the first cross-sectional area which increases a velocity of the airflow through the first tube;

wherein the first tube includes a first inlet and a first outlet spaced from each other along the central axis;

wherein the first tube includes a middle portion disposed between the first inlet and the first outlet;

wherein the hole defines a second tube cross-sectional area less than the first cross-sectional area of the first tube;

wherein the second tube includes a second inlet and a second outlet spaced from each other along the central axis, with the second inlet coupled to the forward end of the body and the second outlet coupled to the first inlet of the first tube; and wherein the first tube includes a plurality of ribs extending into the aperture toward the central axis, with the second outlet of the second tube supported by the ribs.

\* \* \* \* \*